(12) United States Patent
Miyoshi et al.

(10) Patent No.: US 8,065,586 B2
(45) Date of Patent: Nov. 22, 2011

(54) RADIO COMMUNICATION APPARATUS

(75) Inventors: Kenichi Miyoshi, Kanagawa (JP);
Ayako Horiuchi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1038 days.

(21) Appl. No.: 11/914,153

(22) PCT Filed: May 18, 2006

(86) PCT No.: PCT/JP2006/309962
§ 371 (c)(1),
(2), (4) Date: Nov. 12, 2007

(87) PCT Pub. No.: WO2006/123751
PCT Pub. Date: Nov. 23, 2006

(65) Prior Publication Data
US 2009/0083605 A1    Mar. 26, 2009

(30) Foreign Application Priority Data
May 18, 2005   (JP) .................................. 2005-145966

(51) Int. Cl.
*H03M 13/00*   (2006.01)
(52) U.S. Cl. ........ 714/752; 714/758; 714/800; 375/267; 375/281; 455/13.2
(58) Field of Classification Search ................. 714/752, 714/758, 800; 375/267, 281; 455/13.2
See application file for complete search history.

(56) References Cited

U.S. PATENT DOCUMENTS

| 4,099,121 A * | 7/1978 | Fang .............................. 375/267 |
| 2001/0018336 A1 | 8/2001 | Okajima et al. |

FOREIGN PATENT DOCUMENTS

| JP | 11-032072 | 2/1999 |
| JP | 11-177622 | 7/1999 |
| JP | 2001-189971 | 7/2001 |
| JP | 2005-354626 | 12/2005 |

OTHER PUBLICATIONS

International Search Report Dated Jul. 18, 2006.

* cited by examiner

*Primary Examiner* — Sam Rizk
(74) *Attorney, Agent, or Firm* — Pearne & Gordon LLP (57) ABSTRACT

A radio communication apparatus of the present invention aims at improving an error rate characteristic in the end receiver. A repeater (radio relay device) RS2 receives a signal transmitted from a repeater RS1 at a point of time of signal transmission from the repeater RS1, and detects whether or not an error exists in the signal at a point of time of transmission. Also, when the repeater RS2 detects the error from a systematic bit S of the transmitted signal from the repeater RS1, such repeater RS2 generates error position information EI, replace a part of a parity bit P with the error position information EI, and transmits a resultant signal. The error detection result is notified through the control channel. The mobile station (mobile terminal) MS makes an error correction based on the error position information EI, and demodulates the signal by executing an error correction decoding process.

9 Claims, 7 Drawing Sheets

RADIO COMMUNICATION APPARATUS

TECHNICAL FIELD

The present invention relates to a radio communication apparatus for transferring an error correction coded signal from a transmitting station to a receiving station and a radio communication apparatus for receiving the signal through a diversity system.

BACKGROUND ART

The multiple hopping transmission system using OFDM (Orthogonal Frequency Division Multiplexing) is known. This multiple hopping transmission system is the radio network that enables the user to communicate with the mobile terminal in a wider range since not only the mobile terminals can communicate directly with each other but also the mobile terminals can communicate mutually via other mobile terminal. In this radio network, the user can not only communicate with the base station in the cell to which the user's mobile terminal belongs but also access the base station out of the cell via another mobile terminal.

Figure 1:
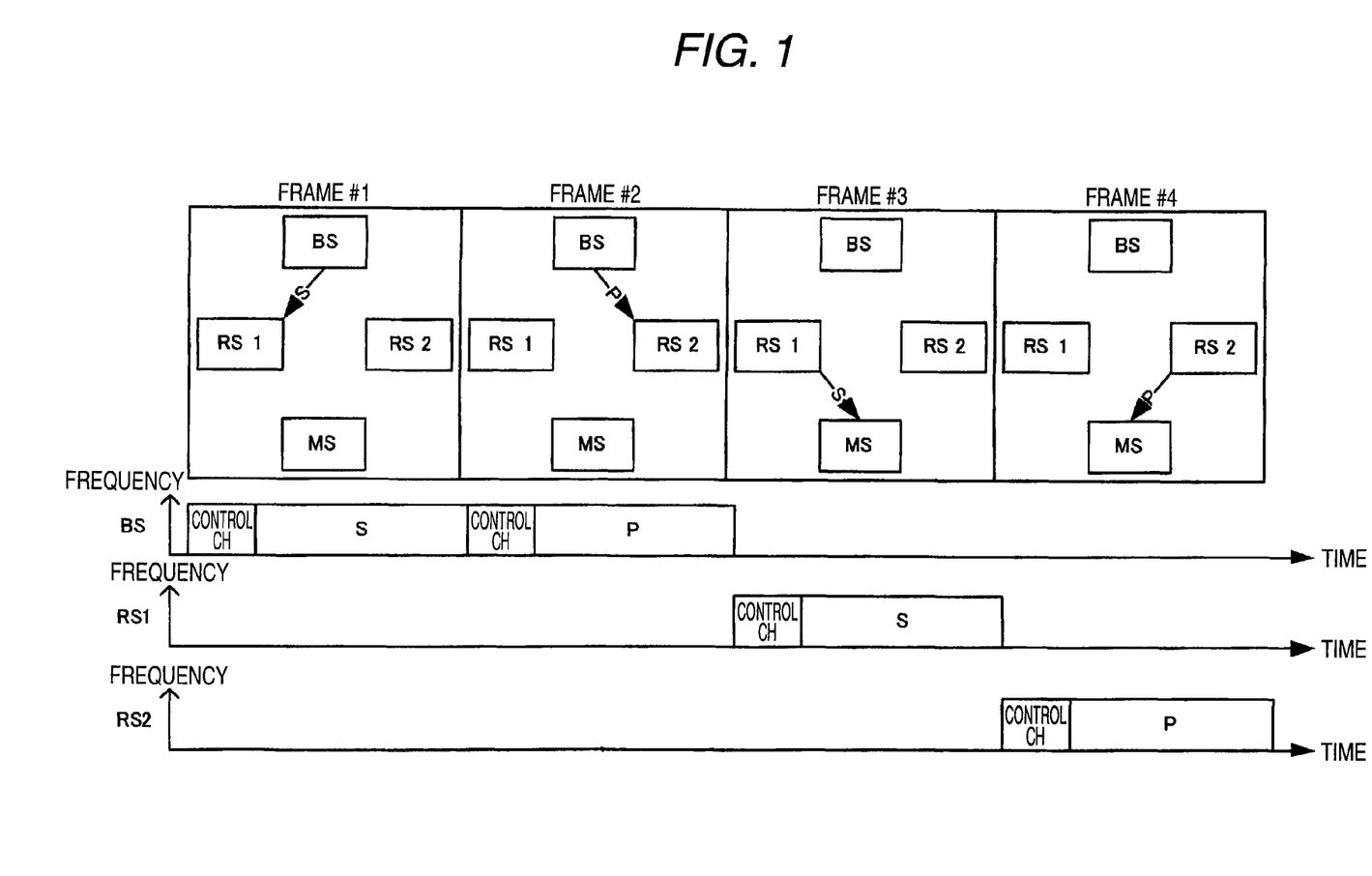
FIG. 1 An explanatory view showing a radio relay system as a premise assumed to communicate by using a plurality of radio relay devices.

FIG. 1 shows a radio relay system as a premise assumed to communicate by using a plurality of radio relay devices. In FIG. 1, the base station BS applies an error correction coding to transmitted data, and generates a signal C1 and a signal C2. Here, the signal C1 and the signal C2 have a different redundancy respectively. For example, C1=systematic bit S and C2=parity bit are assumed.

A signal C1(S) and a signal C2(P) are transmitted to a mobile station MS (mobile terminal) through repeaters RS (radio relay units) provided to different propagation paths, i.e., a repeater RS1 and a repeater RS2. In this case, slots through which the signal C1(S) and the signal C2(P) are transmitted respectively are separate slots, and the repeater RS1 reproduces the signal C1(S) and repeats it and the repeater RS2 reproduces the signal C2(P) and repeats it. The mobile station MS executes an error correction decoding by using the signal C1(S) and the signal C2(P).

In this manner, when two repeaters RS1, RS2 pass on the signal from the base station BS to the mobile station MS respectively, these repeaters RS1, RS2 pass on a different system (a systematic bit S and a parity bit P) respectively to achieve the diversity effect.

In this case, the error correction system such as LDPC (Low Density Parity Check Codes), turbo code, or the like is executed as the error correction system. In the turbo code, two types of information of the systematic bit S and the parity bit P having different quality are generated as the error correction bit. The systematic bit S are more important than the parity bit P to the error correction.

As shown in FIG. 1, first the base station BS transmits the systematic bit S and the parity bit P to the repeater RS1 and the repeater RS2 by using two frames (#1, #2) respectively. Then, the repeater RS1 passes on the signal in a next frame #3, and the repeater RS2 passes on the signal in a frame #4 after next. The mobile station MS receives both signals from the repeater RS1 and the repeater RS2, and demodulates both received signals by an error correction decoding process.

In the process in the repeater RS in the prior art, the signal is transferred while applying a hard decision (the received signal has a value in a range of −∞ to +∞, but the signal is converted into −1 if the value is negative and converted into 1 if the value is positive) to the received signal. That is, a hard decision signal is transferred irrespective of the presence or absence of the error in the received signal. The reason why the signal is transmitted as it is even though such signal contains the error is that, because there is a possibility that the error can be corrected by the error correction decoding at the end receiving station, the final receiving performance may be improved and therefore the signal had better be transmitted (see Patent Literature 1, for example).

Patent Literature 1: JP-A-2001-189971

DISCLOSURE OF THE INVENTION

Problems that the Invention is to Solve

However, in the radio relay system in the prior art, when the repeater RS fails to reproduce the signal and the signal of the repeater RS is wrong at a point of time of transmission, the error rate characteristic at the mobile station MS deteriorates. In particular, in a situation that the deterioration of the error rate characteristic at the mobile station MS is caused more seriously by the error of the signal C2 than the error of the signal C1 (for example, a situation that the signal C1 is the systematic bit S and the signal C2 is the parity bit P), the error rate characteristic at the mobile station MS deteriorates dramatically when the repeater RS1 fails to reproduce the signal C1 (the systematic bit S) and transmits the wrong signal C1.

Figure 2:
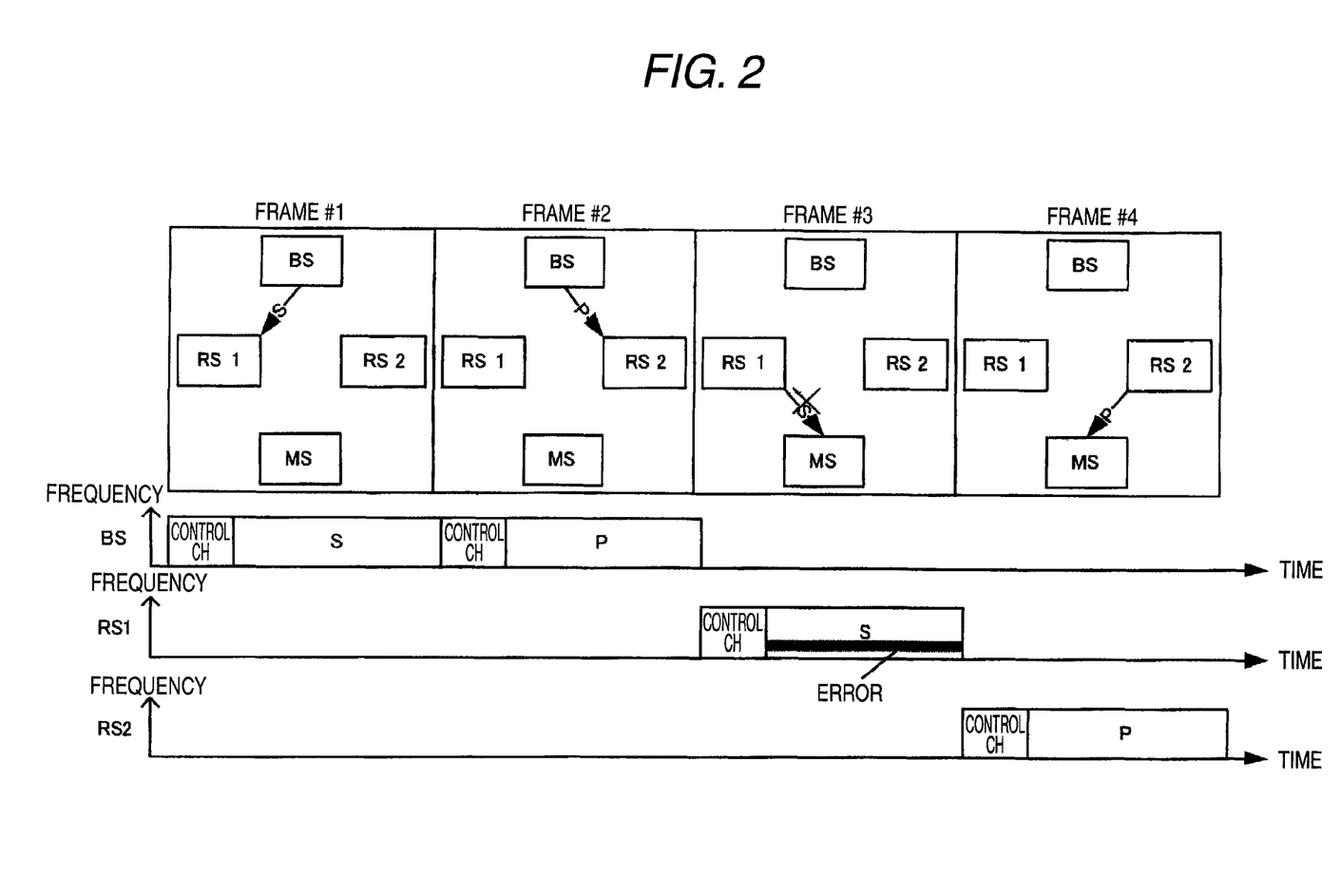
FIG. 2 An explanatory view showing the case where an error exists in a transmit signal of a repeater RS1 at a point of time of transmission.

FIG. 2 shows the case where an error exists in a transmit signal of a repeater RS1 at a point of time of transmission. In the frame #3 shown in FIG. 2, when the error exists in the repeating signal from the repeater RS1 at a point of time of transmission and the important bit (the systematic bit S in the error correcting code, or the like) is wrong, the final performance deteriorates. This is because the systematic bit S is the bit that dominates the error arte in the error correcting code and thus the error cannot be decoded correctly when this bit is received in error. Therefore, it is important how the error of the systematic bit S should be avoided.

The present invention has been made in view of the above circumstances in the prior art, and it is an object of the present invention to provide a radio communication apparatus capable of improving an error rate characteristic in an end receiver.

Means for Solving the Problems

A radio communication apparatus of the present invention provided in a plurality of propagation paths between a transmitting station and a receiving station in a diversity system to pass on an error correction coded signal from the transmitting station to the receiving station, includes a monitoring section for monitoring repeating signals that are transmitted through different propagation paths; an error detecting section for detecting an error in monitored signals; a hard deciding section for making a hard decision of the monitored signals; an error position information generating section for generating error position information based on an error detection result and a hard decision result; a signal generating section for generating a repeating signal by adding the error position information to a signal from the transmitting station; and a transmitting section for transmitting a generated repeating signal to the receiving station.

According to the above configuration, the error occurred at a point of time when the repeating signals whose propagation paths are different are transmitted can be canceled in the receiving station by notifying the receiving station of the error of repeating signals whose propagation paths are different. Therefore, an error rate characteristic in the receiving station can be improved. For example, in the case of the turbo coding system, if the radio communication apparatus that relays the parity bit P monitors the systematic bit S and notifies the receiving station of the error of this signal, the error occurred at a point of time when the systematic bit S is transmitted can be canceled. Therefore, the final performance in the receiving station can be improved.

Also, in the radio communication apparatus of the present invention, the signal generating section generates the repeating signal by replacing a part of the signal form the transmitting station with the error position information.

Also, in the radio communication apparatus of the present invention, the monitoring section monitors a systematic bit of a turbo code.

Also, the radio communication apparatus of the present invention further includes a measuring section for measuring a pilot signal of the repeating signals whose propagation paths are different; wherein the error detecting section executes an error detection only from bits that are transmitted by sub-carriers decided by referring to the measured result, and the hard deciding section executes the error detection only from bits that are transmitted by sub-carriers decided by referring to the measured result. According to the above configuration, the error is detected only from the bits that are transmitted by the sub-carrier whose channel quality is good. Therefore, even though a situation of the propagation path is not good, the exact error detection can be executed.

Also, a radio communication apparatus of the present invention for receiving in a diversity system, includes a receiving section for receiving a first repeating signal from the radio communication apparatus of the present invention; an error position information extracting section for extracting error position information from the first repeating signal; an error correcting section for making an error correction based on extracted error position information; a receiving section for receiving a second repeating signal as an object of the error correction; and an error correction decoding section for error-correcting/decoding the signal from a transmitting station based on the first repeating signal and the second repeating signal whose error is corrected.

Also, in the radio communication apparatus of the present invention, the error correcting section inverts a bit at an error location in the second repeating signal based on the error position information.

Advantage of the Invention

According to the present invention, the error occurred at a point of time when the repeating signals whose propagation paths are different are transmitted can be canceled in the receiving station by notifying the receiving station of the error of repeating signals whose propagation paths are different. Therefore, an error rate characteristic in the receiving station can be improved.

DESCRIPTION OF REFERENCE NUMERALS

41 error correction coding section
42, 43 buffer
44, 62, 72 switching section
45 error detecting code attaching section
46, 54, 70 transmitting RF section
47, 50, 60, 78 antenna
51, 61, 71 receiving RF section
52, 63, 66 hard deciding section
53, 69 modulating section
64, 77 error correction decoding section
65 error detecting section
67 data replacing section
68 error position information generating section
73, 75 demodulating section
74 bit inverting section
76 error position information extracting section

BEST MODE FOR CARRYING OUT THE INVENTION

Figure 3:
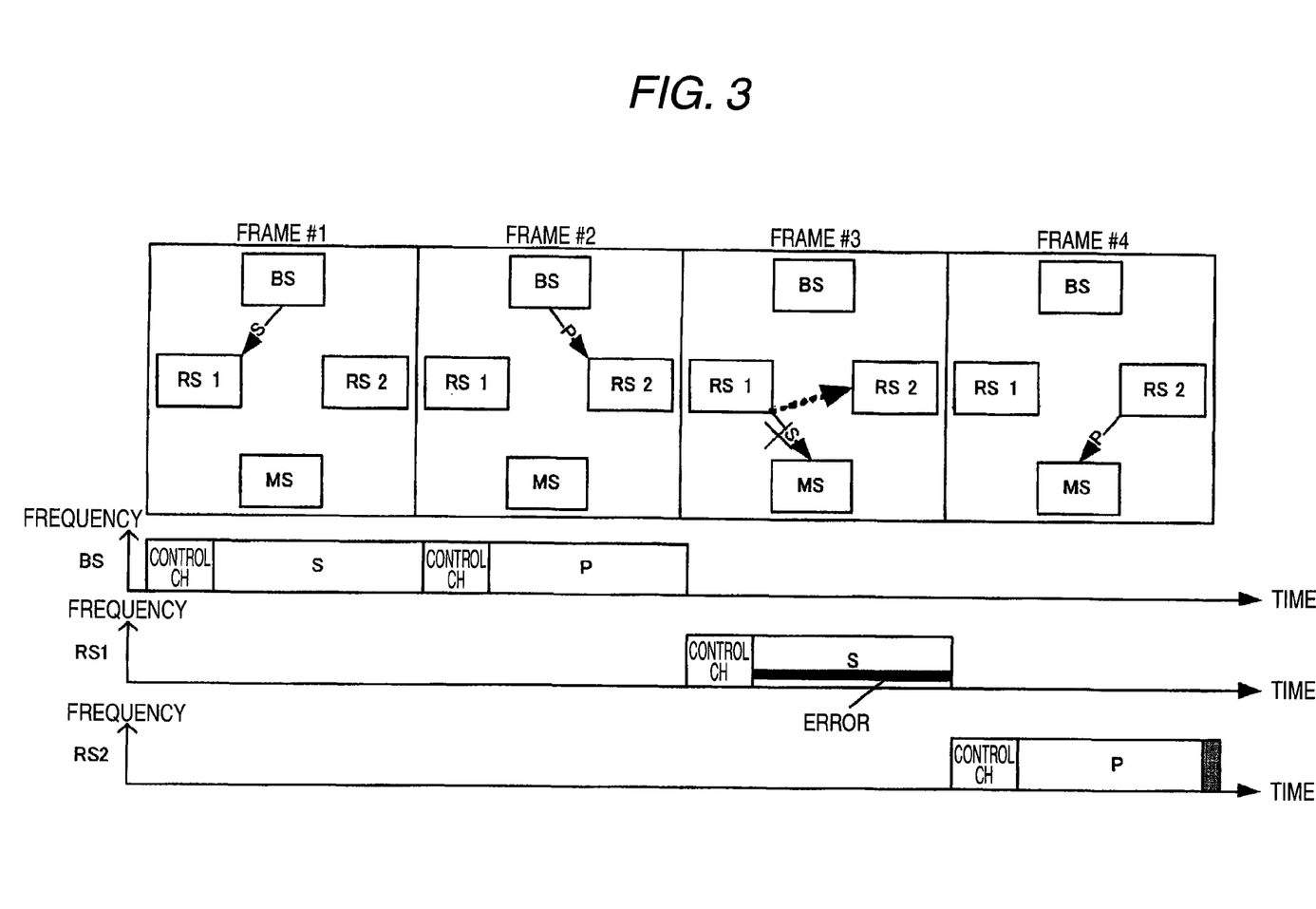
FIG. 3 A schematic configurative view of a radio relay system according to an embodiment of the present invention.

FIG. 3 is a schematic configurative view of a radio relay system according to an embodiment of the present invention. An outline of the radio relay system will be explained with reference to FIG. 3 hereunder. As shown in FIG. 3, the radio relay system includes the base station (transmitting station), the repeaters (radio relay devices) RS1, RS2, and the mobile station (mobile terminal) MS (receiving station). The repeaters RS1, RS2 are arranged in a plurality of propagation paths between the base station BS and the mobile station MS as the receiving station of the diversity system, and pass on the error correction coded signal from the base station BS to the mobile station MS. The repeater RS2 monitors the signal transmitted from the repeater RS1 at a point of time of transmission from the repeater RS1, and detects whether or not the error existed at a point of time of transmission.

Also, when the repeater RS2 detects the error in the systematic bit S of the transmitted signal from the repeater RS1, such repeater RS2 generates error position information EI (Error Information), replaces a part of the parity bit P with the error position information EI, and transmits the resultant signal. The result of error detection is notified through the control channel.

The mobile station MS receives the systematic bit S transferred from the repeater RS1 and the parity bit P transferred from the repeater RS2. When the parity bit P contains the error position information EI, the mobile station MS applies the error correction based on the error position information EI and demodulates the signal by the error correction decoding process.

In this case, the repeater RS2 notifies the mobile station MS of a flag (0, 1) indicating whether or not the error position information EI is present and an offset value indicating from where the error position information EI starts as control information.

When the flag of control information is "1", the mobile station MS decides that the error position information EI is present, reads a subsequent offset value, and acquires the error position information EI by skipping the parity bit P from the offset value. Also, the mobile station MS extracts a bit error start position and a bit error end position from the acquired error position information EI, and makes a correction of information by inverting the bit of the data within this range.

In this manner, in the radio relay system of the present embodiment, the repeater RS2 that relays the signal C2 monitors the signal transmitted from the repeater RS1 that relays the signal C1, and checks whether or not the signal C1 that the repeater RS1 transmitted contains the error at a point of time of transmission. Then, when the signal C1 that the repeater RS1 transmitted contains the error at a point of time of transmission, the repeater RS2 replaces a part of the signal C2 that is transmitted from the repeater RS2 to the mobile station MS with the error position information EI, and then transmits the resultant signal to the mobile station MS. The error position information EI is the information indicating "which bit of the signal C1 contained the error at a point of time of transmission (relay)".

According to the radio relay system of the present embodiment, the error occurred at a point of time when the repeating signals are transmitted from the repeater RS1 can be canceled in the mobile station MS by notifying the mobile station MS of the error of the repeating signal (the repeating signal from the repeater RS1) whose propagation paths are different. Therefore, an error rate characteristic in the mobile station MS can be improved. Here, since the signal C1 has a larger influence on the error rate than the signal C2, the mobile station MS can improve the error rate characteristic by receiving exactly the signal C1 rather than the signal C2.

Figure 4:
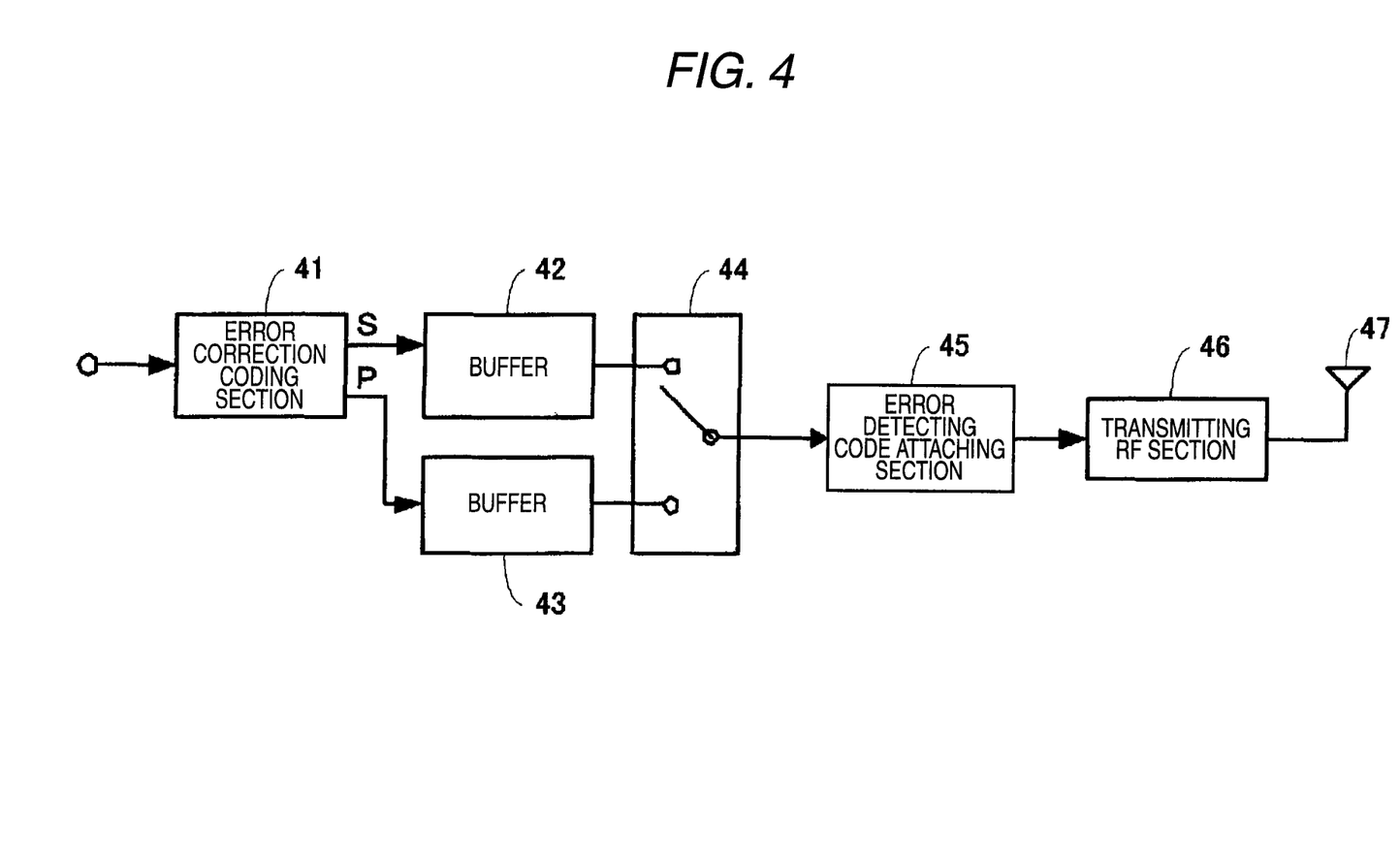
FIG. 4 A schematic block diagram of a base station in the embodiment of the present invention.

FIG. 4 shows a schematic block diagram of a base station BS in a radio relay system of the embodiment of the present invention. The base station in the present embodiment includes an error correction coding section 41 for generating the systematic bit S and the parity bit P by applying an error correction coding to the transmitting information, a buffer 42 for storing temporarily the systematic bit S, a buffer 43 for storing temporarily the parity bit P, a switching section 44 for selecting either of the systematic bit S and the parity bit P, an error detecting code attaching section 45 for attaching an error detecting code to the transmission signal, a transmitting RF section 46 for RF-amplifying the transmission signal and modulating the amplified signal, and an antenna 47 for transmitting the transmission signal to the repeater RS.

The error correction coding of the transmitted data is executed by the error correction coding section 41, and the signals that was subjected to the error correction coding are modulated and then transmitted by the transmitting RF section 46. Out of the signals that were subjected to the error correction coding, the systematic bit S is transmitted to the mobile station MS via the repeater RS1 while the parity bit P is transmitted to the mobile station MS via the repeater RS2.

Figure 5:
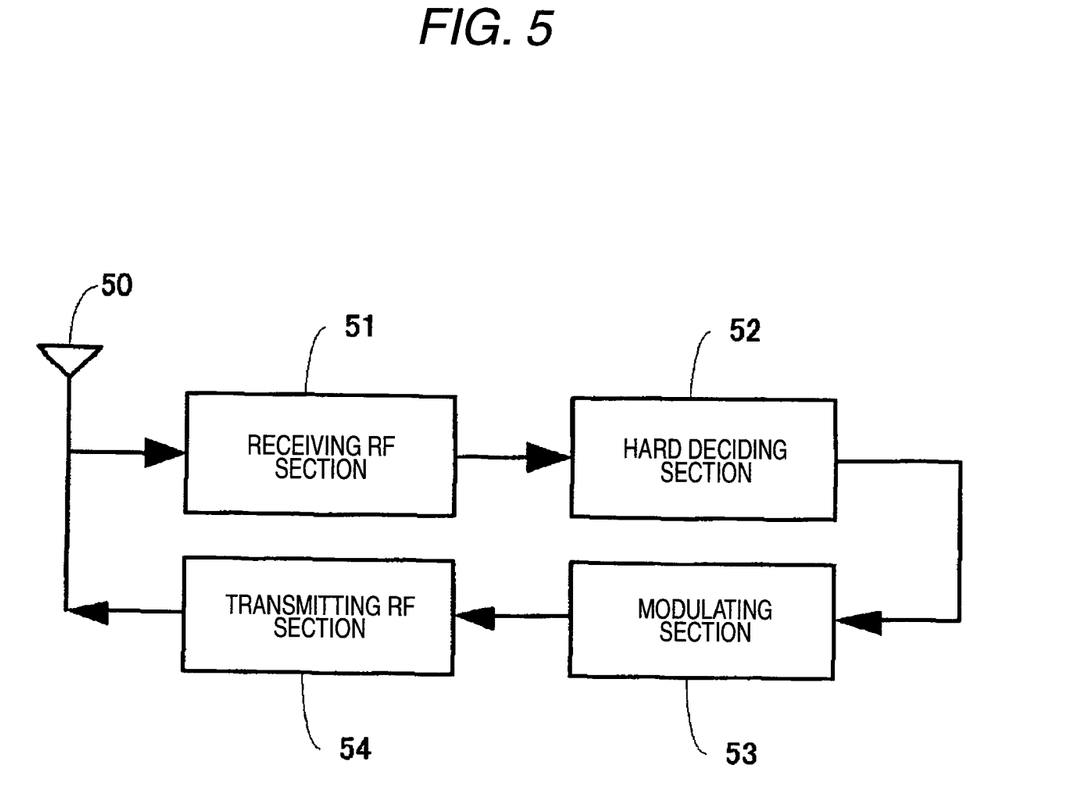
FIG. 5 A schematic block diagram of a repeater 1 in the embodiment of the present invention.

FIG. 5 shows a schematic block diagram of a repeater RS1 in the radio relay system of the embodiment of the present invention. The repeater RS1 has an antenna 50 for receiving transmitted data from the base station BS, a receiving RF section 51 for RF-amplifying received data, a hard deciding section 52 for making a hard decision of the received data, a modulating section 53 for modulating the received data, and a transmitting RF section 54 for RF-amplifying the received data after the modulation and transmitting the amplified data.

When the received signal has a value in a range of $-\infty$ to $+\infty$, the hard deciding section 52 converts the signal into $-1$ if the value is negative and converts the signal into 1 if the value is positive. The signal that was subjected to the hard decision is subjected to the re-modulating process and then transmitted by the modulating section 53. The repeater RS1 has the same configuration as that of the repeater in the prior art.

Figure 6:
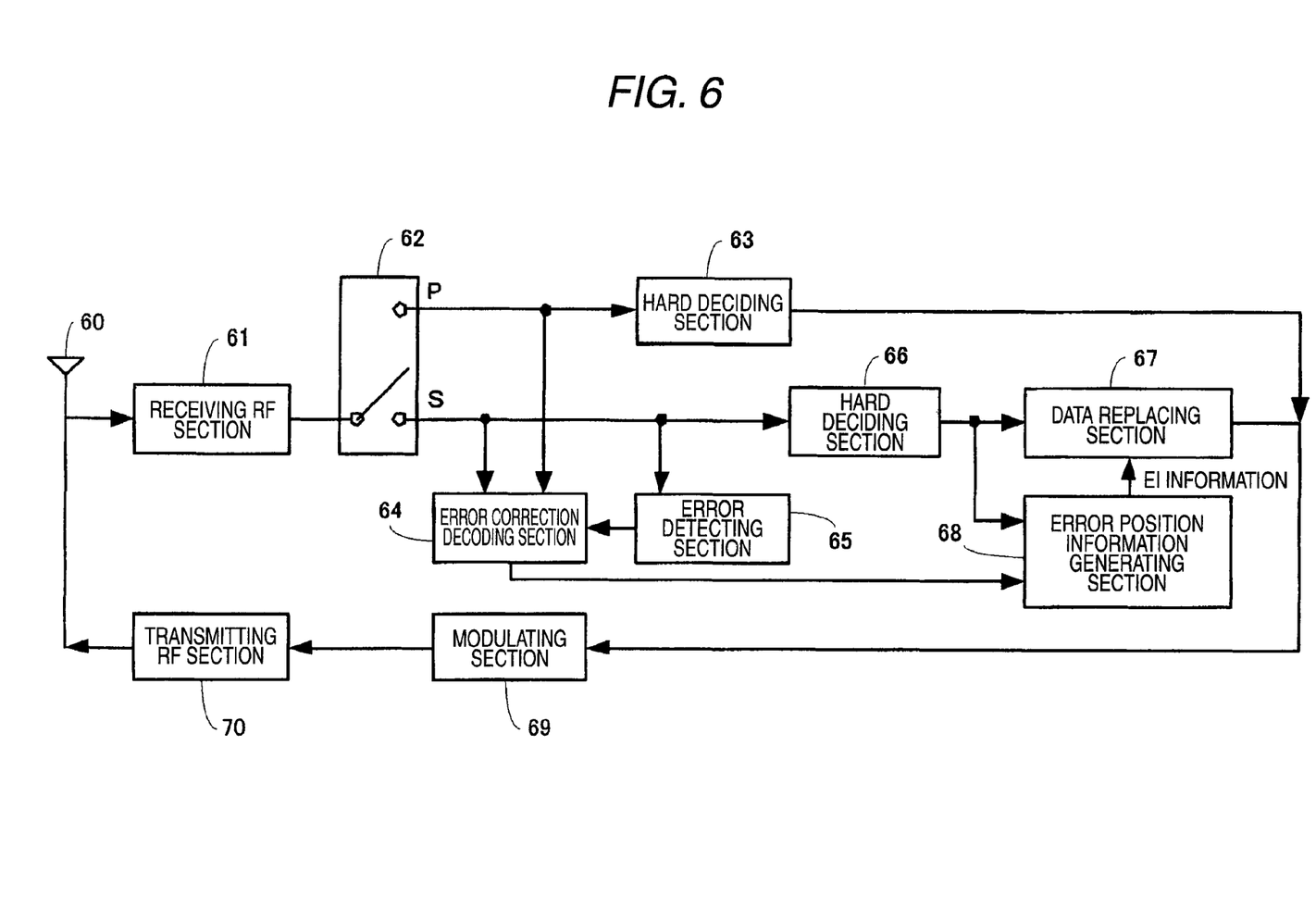
FIG. 6 A schematic block diagram of a repeater 2 in the embodiment of the present invention.

FIG. 6 shows a schematic block diagram of a repeater (radio relay equipment) RS2 in the radio relay system of the embodiment of the present invention. The repeater RS2 of the present embodiment includes an antenna 60 for receiving transmitted data from the base station BS, a receiving RF section 61 for RF-amplifying the received data and extracting the parity bit P and the systematic bit S, a switching section 62 for selecting either of the parity bit P and the systematic bit S, a hard deciding section 63 for making a hard decision of the parity bit P, a hard deciding section 66 for making a hard decision of the systematic bit S, an error correction decoding section 64 for executing an error correction decoding based on the systematic bit S and the parity bit P, an error detecting section 65 for executing an error detection of the systematic bit S, an error position information generating section 68 for generating error position information EI from an output of the hard deciding section 66 and an output of the error correction decoding section 64, a data replacing section 67 for replacing a part of the output of the hard deciding section 66 with the error position information EI, a modulating section 69 for modulating repeated data containing the error position information EI, and a transmitting RF section 70 for RF-amplifying an output of the modulating section 69 and transmitting the amplified signal.

When the signal received by the receiving RF section 61 is the parity bit P, the repeater RS2 executes the normal repeating process. The receiving RF section 61 receives and processes the systematic bit S that the repeater RS1 transmitted, at a timing (frame #3) at which the repeater RS1 transmits the signal. The receiving RF section 61 extracts a data portion and a pilot portion from the systematic bit S, and executes an error detection by applying the hard decision to the data portion. When no error was detected, nothing is done.

When the error was detected, the error correction decoding process is executed by using the hard decision result of the already-received parity bit P and the hard decision result of the systematic bit S received this time. Then, it is checked in which portion of the hard decision bit of the systematic bit S the error exists, by comparing the hard decision bits of the systematic bits S mutually, and the error position information EI is generated. A part of the parity bit P sent from the base station BS is replaced with the generated error position information EI, and the resultant signal is transmitted to the mobile station MS.

In this manner, the repeater RS2 of the present embodiment monitors the repeating signal from the repeater RS1, and detects whether or not the error is contained in the repeating signal at a point of time of transmission. In the prior art, the repeater RS2 does not receive the transmitted signal from the repeater RS1. In the present embodiment, some repeater RS2 receives the repeating signal (the repeating signal of the repeater RS1) whose propagation path is different.

When the repeater RS2 detects the error from the signal at a point of time of transmission of the repeater RS1, the repeater RS2 transmits the information of "in which part of the transmitted signal from the repeater RS1 the error is contained at a point of time of transmission" to the mobile station MS. The mobile station MS executes the error correction decoding process by inverting a part of the already-received repeating signal from the repeater RS1 based on this information.

According to the present embodiment, the mobile station MS can know that the received signal has contained the error at a point of time of transmission. Also, since the concerned bit is inverted before the error correction decoding, the performance of the error correction decoding in the mobile station can be improved and also the error rate characteristic can be improved.

Figure 7:
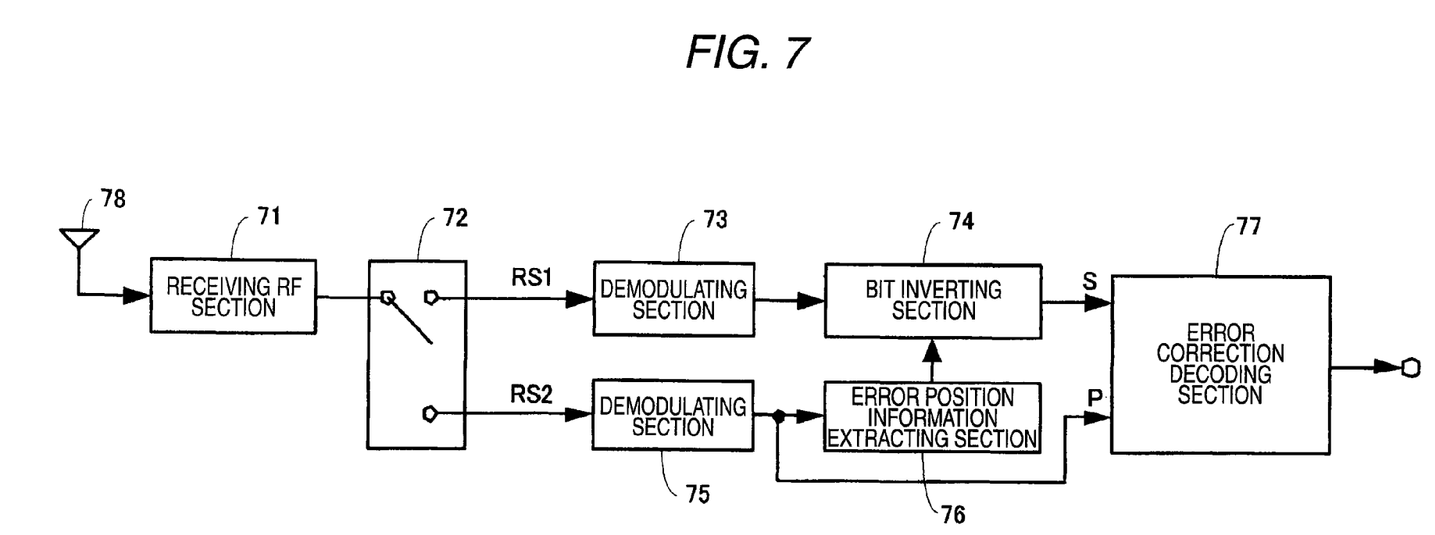
FIG. 7 A schematic block diagram of a mobile station in the embodiment of the present invention.

FIG. 7 shows a schematic block diagram of a mobile station (mobile terminal) MS in the embodiment of the present invention. The mobile station MS in the present embodiment includes an antenna 78 for receiving a signal from the repeater RS, a receiving RF section 71 for RF-amplifying a received signal, a switching section 72 for switching either of a signal from the repeater RS1 and a signal from the repeater RS2, a demodulating section 73 for demodulating a signal from the repeater RS1, a demodulating section 75 for demodulating a signal from the repeater RS2, an error position information extracting section 76 for extracting the error position information EI from the signal from the repeater RS2, a bit inverting section 74 for executing a bit inversion at an error location of the signal from the repeater RS1 based on the error position information EI, and an error correction decoding section 77 for executing an error correction decoding based on the systematic bit S and the parity bit P.

In the present embodiment, the mobile station MS first demodulates the signal received from the repeater RS1 and saves the demodulated signal. Then, the mobile station MS demodulates the signal received from the repeater RS2 and decides whether or not the error position information EI is contained.

When the error position information EI is not contained, the error correction decoding process is executed by using the systematic bit S received from the repeater RS1 and the parity bit P received from the repeater RS2. Thus, the received signal is demodulated and output.

In contrast, when the error position information EI is contained, the bit at the error location in the received signal from the repeater RS1 is inverted based on the error position information EI, and then the error correction decoding process is executed. Thus, the received signal is demodulated and output.

The reason why the bit is inverted is given as follows. The transmitted signal in the repeater is +1 or −1. When the repeater transmits the signal in error at a time of transmission, two cases are considered as follows. One is the case where, although the signal of +1 is correct, the signal of −1 is transmitted and the other is the case where, although the signal of −1 is correct, the signal of +1 is transmitted. In both cases, the signal was transmitted correctly by inverting the received signal (multiplying the received signal by −1), and therefore the error occurred at a point of time of transmission can be canceled.

According to the present embodiment, the receiving station can know that the error exits in the repeating signal from the repeater RS1 at a point of time of transmission. Therefore, the receiving station can produce the same condition as the condition in which the correct signal was transmitted, by inverting the concerned portion. As a result, the receiving station can produce the same condition as the condition in which no error occurred at a time of repetition in the repeater RS1, and thus the error rate characteristic in the mobile station MS can be improved.

In this manner, in the present embodiment, when the repeater RS2 receives the signal transmitted from the other repeater RS1 and detects that the error exited in the signal at a point of time of transmission, such repeater RS2 notifies the mobile station MS of the presence of the error bit "error detected result" and the information of the error bit "error position information". A concrete data structure of the error position information is combinational information of the bit error start position and the bit error end position, for example.

Therefore, the mobile station MS can know that the received signal was wrong at a point of time of transmission. Also, since the concerned bit is inverted before the error correction decoding, the performance of the error correction decoding in the mobile station MS can be improved and also the error rate characteristic can be improved.

In this case, it may be considered that, when the repeater RS2 executes the error detection from the signal at a point of time of transmission from the repeater RS1, the exact error detection cannot be executed if a situation of the propagation path from the repeater RS1 to the repeater RS2 is bad.

However, the error detection is not applied to all signals in such case, but a part of the signal is used in the error detection. For example, the repeater RS2 measures the pilot signal of the signals transmitted from the repeater RS1, and then executes the error detection from the bits that are carried by the sub-carrier whose channel quality is good from the repeater RS1 to the repeater RS2. Namely it may be concluded that, if the received signal, though it was transmitted by the sub-carrier whose channel quality is good, contains the error, the signal was wrong at a point of time of transmission from the repeater RS1.

Also, respective functional blocks used in the explanation of the above embodiment are embodied typically by LSI as the integrated circuit. These blocks may be provided discretely by one chip respectively, a part or all of blocks may be provided by one chip.

Herein, LSI is used to embody the functional blocks. But the LSI is called IC, system LSI, super LSI, and ultra LSI according to difference in an integration degree.

Also, the use of the integrated circuit is not limited to LSI. The functional blocks may be implemented by the dedicated circuit or the general-purpose processor. The FPGA (Field Programmable Gate Array) that can be programmed after the LSI manufacture or the reconfigurable processor in which connection or setting of circuit cells in the LSI is reconfigurable may be employed.

In addition, when a new technology applied to the integrated circuit replaced with the LSI appears according to the progress of the semiconductor technology or another derivative technologies, the functional blocks may be of course integrated by using such technology. The application of the biotechnology may be considered as a possibility.

The present invention is explained in detail with reference to the particular embodiment. But it is apparent for those skilled in the art that various variations and modifications can be applied without departing from a spirit and a scope of the present invention.

This application is based upon Japanese Patent Application (Patent Application No. 2005-145966) filed on May 18, 2005; the contents of which are incorporated herein by reference.

INDUSTRIAL APPLICABILITY

The present invention possesses such an advantage that an error rate characteristic in the receiving station can be improved since the error occurred at a point of time when the repeating signals whose propagation paths are different are transmitted can be canceled in the receiving station by notifying the receiving station of the error of repeating signals whose propagation paths are different, and is useful to the radio communication apparatus for transferring the error correction coded signal from the transmitting station to the receiving station and the radio communication apparatus for receiving the signal through the diversity system.

The invention claimed is:

1. A relay station apparatus provided in a plurality of propagation paths between a transmission apparatus and a reception apparatus in a diversity technique to relay an error correction coded signal from the transmission apparatus to the reception apparatus, the relay station apparatus comprising:
   a monitoring section which monitors the error correction coded signal from the transmission apparatus through a first propagation path between the relay station and the transmission apparatus, and monitors a first relay signal that is transmitted by another relay station apparatus that relays the error correction coded signal from the transmission apparatus to the reception apparatus, through a second propagation path different from the first propagation path;
   an error detecting section which detects an error in the received first relay signal;
   a hard deciding section which makes a hard decision of the received first relay signal;
   an error position information generating section which generates error position information based on an error detection result and a hard decision result;
   a signal generating section which generates a second relay signal by adding the generated error position information to the received error correction coded signal from the transmission apparatus; and
   a transmitting section which transmits the generated second relay signal to the reception apparatus.

2. The relay station apparatus according to claim 1, wherein the signal generating section generates the second relay signal by replacing a part of the received error correction coded signal from the transmission apparatus with the error position information.

3. The relay station apparatus according to claim 1, wherein a reception section receives at least a systematic bit of a turbo code.

4. The relay station apparatus according to claim 3, further comprising:
   an error correction decoding section that executes error correction decoding based on the received first relay signal including a systematic bit and a parity bit,
   wherein the error position information is information indicating an error position in the systematic bit, and
   wherein the signal generating section adds the error position information by replacing a part of the parity bit with the error position information.

5. The relay station apparatus according to claim 1, further comprising:
   a measuring section which measures a pilot signal of the first relay signal from the another relay station apparatus,
   wherein the error detecting section executes an error detection only from a bit that is transmitted by a sub-carrier decided by referring to the measured result of measuring the pilot signal; and
   wherein the hard deciding section executes the error detection only from the bit that is transmitted by the sub-carrier decided by referring to the measured result of measuring the pilot signal.

6. A reception apparatus for receiving in a diversity technique, the reception apparatus comprising:
   a receiving section which receives the second relay signal from the relay station apparatus set forth in claim 1, and receives the first relay signal from the another relay station apparatus;
   an error position information extracting section which extracts the error position information from the second relay signal; and
   an error correcting section which makes an error correction in the first relay signal based on the extracted error position information.

7. The reception apparatus according to claim 6, wherein the error correcting section inverts a bit at an error location in the first relay signal based on the error position information.

8. A method for relaying an error correction coded signal from a transmission apparatus to a reception apparatus by a relay station apparatus provided in a plurality of propagation paths between the transmission apparatus and the reception apparatus, wherein the error correction coded signal is configured for use in a diversity technique, the method comprising the steps of:
   receiving and monitoring the error correction coded signal from the transmission apparatus through a first propagation path between the relay station and the transmission apparatus;
   receiving and monitoring a first relay signal that is transmitted by another relay station apparatus that relays the error correction coded signal from the transmission apparatus to the reception apparatus, through a second propagation path different from the first propagation path;
   detecting an error in the received first relay signal;
   making a hard decision of the received first relay signal;
   generating error position information based on a result of the step of detecting an error in the received first relay signal and based on a result of the step of making a hard decision of the received first relay signal;
   generating a second relay signal by adding the generated error position information to the received error correction coded signal from the transmission apparatus; and
   transmitting the generated second relay signal to the reception apparatus.

9. The method of claim 8, further comprising the steps of:
   receiving the first relay signal by the reception apparatus;
   receiving the second relay signal by the reception apparatus;
   extracting, by the reception apparatus, the error position information from the second relay signal; and
   correcting, by the reception apparatus, the error in the first relay signal using the extracted error position information.

* * * * *

UNITED STATES PATENT AND TRADEMARK OFFICE
CERTIFICATE OF CORRECTION

PATENT NO.       : 8,065,586 B2
APPLICATION NO.  : 11/914153
DATED            : November 22, 2011
INVENTOR(S)      : Kenichi Miyoshi et al.

It is certified that error appears in the above-identified patent and that said Letters Patent is hereby corrected as shown below:

In column 6, line 21, please delete "20"

Signed and Sealed this
Twenty-ninth Day of May, 2012

David J. Kappos
*Director of the United States Patent and Trademark Office*